US009077215B2

(12) United States Patent
Kagawa et al.

(10) Patent No.: US 9,077,215 B2
(45) Date of Patent: Jul. 7, 2015

(54) ROTARY ELECTRIC MACHINE

(75) Inventors: Ryuta Kagawa, Kitakyushu (JP); Kenji Matsuura, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 277 days.

(21) Appl. No.: 13/347,701

(22) Filed: Jan. 11, 2012

(65) Prior Publication Data

US 2013/0057119 A1 Mar. 7, 2013

(30) Foreign Application Priority Data

Sep. 7, 2011 (JP) ................. 2011-195074

(51) Int. Cl.
*H02K 11/00* (2006.01)
*H02K 7/102* (2006.01)
*H02K 21/14* (2006.01)
*H02K 7/14* (2006.01)

(52) U.S. Cl.
CPC .............. *H02K 7/1025* (2013.01); *H02K 21/14* (2013.01); *H02K 7/14* (2013.01); *H02K 11/0031* (2013.01)

(58) Field of Classification Search
USPC ........................................ 310/68 B, 75 R–79
See application file for complete search history.

(56) References Cited

U.S. PATENT DOCUMENTS

| 4,663,550 | A | * | 5/1987 | Kawada et al. | ................. 310/93 |
|---|---|---|---|---|---|
| 5,235,227 | A | * | 8/1993 | Fazekas | .......................... 310/51 |
| 5,291,088 | A | * | 3/1994 | Adam et al. | .................... 310/88 |
| 6,603,228 | B1 | * | 8/2003 | Sato | ................................ 310/83 |
| 7,828,541 | B2 | * | 11/2010 | Cude | ............................ 425/149 |
| 2004/0239196 | A1 | * | 12/2004 | Miura et al. | .................... 310/77 |
| 2007/0216240 | A1 | * | 9/2007 | Kikuchi et al. | ............. 310/68 B |
| 2008/0233227 | A1 | * | 9/2008 | Onishi et al. | .................. 425/136 |
| 2008/0290746 | A1 | * | 11/2008 | Strueber | ......................... 310/77 |
| 2009/0284105 | A1 | * | 11/2009 | Miyashita et al. | .......... 310/68 B |
| 2010/0052442 | A1 | * | 3/2010 | Savant | ............................. 310/78 |
| 2010/0078917 | A1 | * | 4/2010 | Oigawa et al. | ............ 280/728.1 |
| 2010/0243894 | A1 | * | 9/2010 | Kato | .......................... 250/336.1 |
| 2011/0025066 | A1 | | 2/2011 | Cipriani | |
| 2011/0066332 | A1 | * | 3/2011 | Sonoda et al. | .................. 701/42 |

FOREIGN PATENT DOCUMENTS

| CN | 1902038 | 1/2007 |
|---|---|---|
| CN | 101557142 | 10/2009 |
| EP | 2245721 B1 | 11/2010 |
| JP | 61-030932 | 2/1986 |
| JP | 61-114963 U | 7/1986 |
| JP | 05-095173 U | 12/1993 |
| JP | 2006-254639 | 9/2006 |

(Continued)

OTHER PUBLICATIONS

Japanese Office Action for corresponding JP Application No. 2011-195074, Aug. 6, 2013.

(Continued)

*Primary Examiner* — Naishadh Desai
(74) *Attorney, Agent, or Firm* — Mori & Ward, LLP

(57) ABSTRACT

A rotary electric machine according to an aspect of an embodiment includes a detector and a brake. The detector is provided at the counter-load side of a shaft for rotating along with a rotor to drive a predetermined load and detects the rotation position of the shaft. The brake is exchangeably provided at the outer circumferential side of the detector to control the rotation of the shaft.

20 Claims, 7 Drawing Sheets

(56) References Cited

FOREIGN PATENT DOCUMENTS

| RU | 2009149433 | 7/2011 |
|---|---|---|
| SU | 1754821 | 8/1992 |
| WO | WO 2008/145363 | 12/2008 |

OTHER PUBLICATIONS

Russian Decision on Grant a Patent for Invention for corresponding RU Application No. 2012138145/07(061822), Dec. 3, 2013.
Chinese Office Action for corresponding CN Application No. 201210050671.X, Aug. 5, 2014.

* cited by examiner

ROTARY ELECTRIC MACHINE

CROSS-REFERENCE TO RELATED APPLICATION

This application is based upon and claims the benefit of priority of the prior Japanese Patent Application No. 2011-195074, filed on Sep. 7, 2011, the entire contents of which are incorporated herein by reference.

FIELD

The embodiment discussed herein is directed to a rotary electric machine.

BACKGROUND

There has been known a conventional rotary electric machine that includes a detector that detects a rotation position of a shaft for rotating along with a rotor to drive a predetermined load and a brake that controls a rotation of the shaft (see Japanese Utility Model Laid-Open No. 5-95173). Because the brake provided in the rotary electric machine is consumables, it is necessary to exchange the brake when it reaches its available time.

However, the conventional rotary electric machine cannot easily perform a brake exchange operation.

SUMMARY

A rotary electric machine according to an aspect of an embodiment includes a detector and a brake. The detector is provided at a counter-load side of a shaft that rotates along with a rotor to drive a predetermined load and detects a rotation position of the shaft. The brake is exchangeably provided at an outer circumferential side of the detector to control a rotation of the shaft.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENT

Hereinafter, a rotary electric machine according to an embodiment of the present disclosure will be explained in detail with reference to the accompanying drawings. In addition, the embodiment disclosed below is not intended to limit the present invention.

Figure 1:
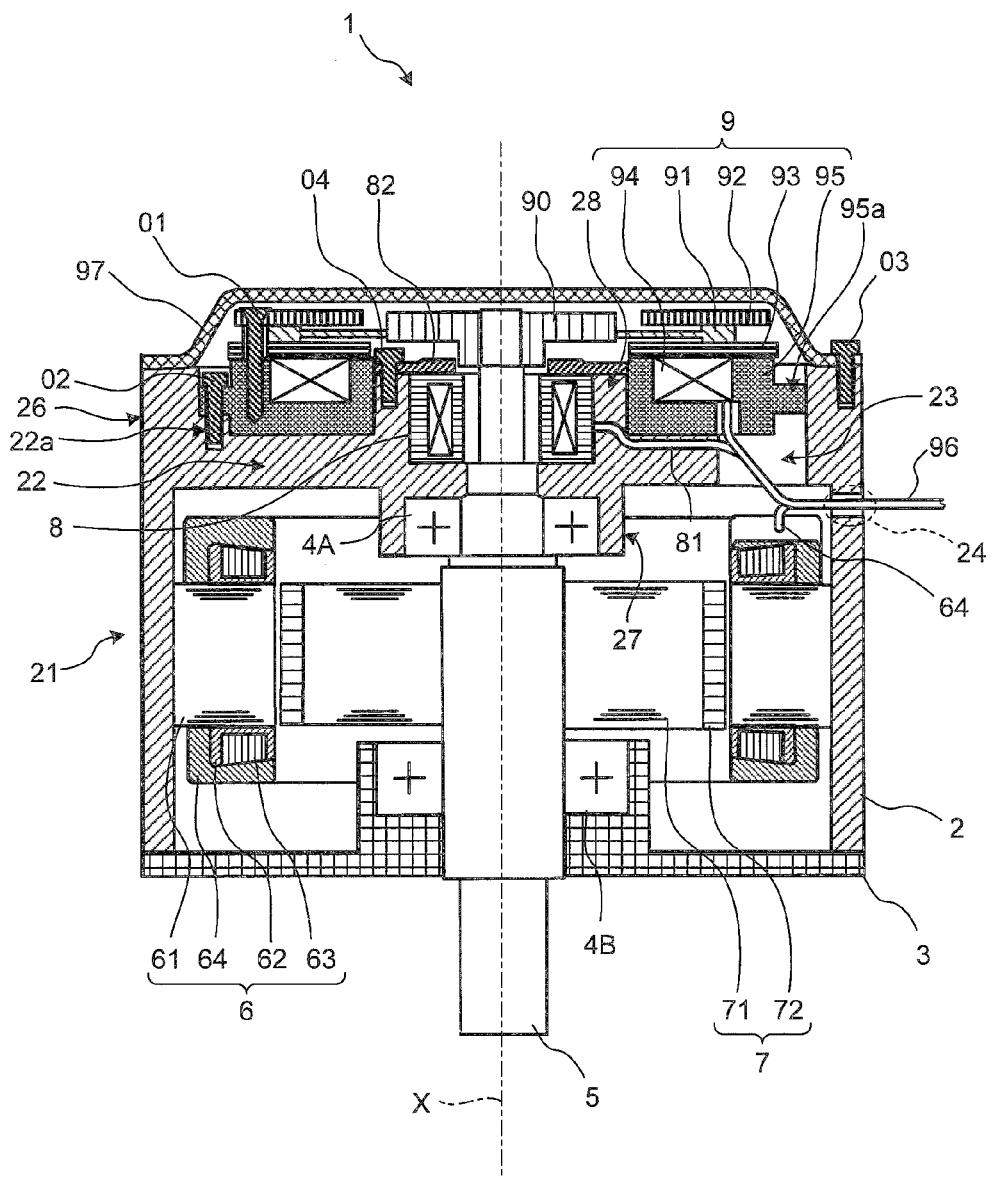
FIG. 1 is a typical vertical cross-sectional view of a rotary electric machine according to an embodiment.

First, the configuration of a rotary electric machine according to an embodiment is explained with reference to FIG. 1. FIG. 1 is a typical vertical cross-sectional view of a rotary electric machine 1 according to the embodiment. Moreover, FIG. 1 illustrates a typical cross section of the rotary electric machine 1 when the rotary electric machine 1 is cut by a plane that includes a rotation axis X of a rotating shaft 5 (hereinafter, "shaft 5") of the rotary electric machine 1 and an extended line of the diameter of the shaft 5.

As illustrated in FIG. 1, the rotary electric machine 1 according to the present embodiment includes a housing 2, a bracket 3, a bearing 4A, a bearing 4B, the shaft 5, a stator 6, a rotor 7, a detector 8, a brake 9, and a brake cover 97.

The rotary electric machine 1 is provided in, for example, a leading end of a robot arm in such a manner that an end effector such as a robot hand that acts as a load is connected to a leading end (lower end of FIG. 1) of the shaft 5 protruded from the rotary electric machine 1. For this reason, for the sake of convenience, it is assumed that the lower end side of the shaft 5 of FIG. 1 is a load side and the upper end side of the shaft 5 of FIG. 1 is a counter-load side.

The housing 2 is a tubular case of which the load side is opened and includes a case part 21 that houses the rotor 7 for rotating along with the shaft 5 and the stator 6 for rotationally driving the rotor 7. The housing 2 further includes a plate-like bracket part 22 that is provided on a counter-load-side end face of the case part 21 and of which the center has a hole through which the shaft 5 is inserted.

The bracket part 22 is integrated with a tube that extends from the central hole to the load side and the counter-load side. Herein, the circular bearing 4A is inserted into the tube (hereinafter, "load-side small-diameter tube 27") that extends from the central hole of the bracket part 22 to the load side.

Moreover, the bracket 3 is attached to a load-side opening end face of the case part 21. In the bracket 3, its outer circumferential portion is attached to a load-side opening end of the case part 21 and its inner circumferential portion holds the circular bearing 4B. The shaft 5 is rotatably held by the bearing 4A and the bearing 4B with a central focus on the rotation axis X.

The rotor 7 includes a cylindrical rotor core 71 that has an inner circumferential surface into which the shaft 5 is fitted and a plurality of permanent magnets 72 that is placed on an outer circumferential surface thereof. The rotor 7 rotates by using the center of the shaft 5 as the rotation axis X. The rotor core 71 is formed by laminating several lamina members such as magnetic steel sheets in order to reduce eddy currents, for example, and takes on a function for permitting the passage of magnetic fluxes of the permanent magnets 72.

The stator 6 includes a circular stator core 61, a bobbin 62, and a stator coil 63 wound on the bobbin 62. The stator 6 is shrunk fit into the case part 21 of the housing 2 in such a manner that its inner circumferential surface is placed opposite the outer circumferential surface of the rotor 7.

The bobbin 62 and the stator coil 63 are molded by resin. A stator wire 64 that supplies three-phase power for driving the shaft 5 to the stator 6 is connected to the stator 6. The manipulation of the stator wire 64 is explained in detail later.

The rotary electric machine 1 generates a rotating magnetic field inside the stator 6 by flowing an electric current into the stator coil 63 of the stator 6. Then, the rotor 7 rotates by the interaction between the rotating magnetic field and the magnetic field generated by the permanent magnets 72 of the rotor 7, and the shaft 5 rotates along with the rotation of the rotor 7.

Moreover, the circular detector 8 is inserted into a tube (hereinafter, "counter-load-side small-diameter tube 28") that extends from the central hole of the bracket part 22 to the counter-load side. In the present embodiment, the detector 8 acts as a resolver that detects a rotation position (angle) of the shaft 5 inserted into a cylindrical hole penetrated in the drawing direction of the shaft 5. In addition, the detector 8 may be an optical detector.

A detector wire 81 that outputs a signal current indicative of the detected rotation position of the shaft 5 to the outside is connected to the detector 8. In addition, the manipulation of the detector wire 81 will be below explained in detail. In this way, in the rotary electric machine 1, the detector 8 is placed at the counter-load side of the shaft 5 with respect to the rotor 7.

In the rotary electric machine 1, the brake 9 for controlling the rotation of the shaft 5 is attached to the counter-load side of the shaft 5 farther than the arrangement position of the detector 8. Moreover, in the rotary electric machine 1, the brake 9 is exchangeably provided at the outer circumferential side of the detector 8. The brake 9 is a unitized circular damping device, which is fitted into a discal hub 90 that is attached to the counter-load-side end of the shaft 5 and is mounted on the counter-load-side face of the bracket part 22 by a screw 02.

More specifically, the brake 9 includes a fixed disk (hereinafter, "plate 92"), a braking mechanism, and a brake disk 91. The braking mechanism includes a non-rotational movable plate (hereinafter, "armature 93"), an electromagnet 94, and an electromagnet case 95. The braking mechanism of the brake 9 is provided at a position distant from the shaft 5 to the radial-direction outside of the shaft 5 at a position closer to the load side than that of the brake disk 91.

A salient portion 95a is formed on the outer circumferential portion of the electromagnet case 95. A threaded hole for inserting the screw 02 is formed in the salient portion 95a. In addition, a salient portion 22a for fitting with the salient portion 95a is formed on the counter-load-side face of the bracket part 22.

The brake disk 91 is provided at the counter-load side of the detector 8. The brake disk 91 is a circular disk. In this case, a spline process is performed on the inner circumferential surface of the brake disk 91. Moreover, the spline process is performed on the outer circumferential surface of the hub 90. Therefore, the hub 90 becomes a spline shaft to rotate along with the shaft 5. The brake disk 91 is a rotating part that rotates along with the shaft 5 by fitting its inner circumferential surface into the outer circumferential surface of the hub 90.

The plate 92 is a discal friction plate that sandwiches the brake disk 91 in cooperation with the armature 93 at the time of braking. The plate 92 is attached and fixed to the electromagnet case 95 by a screw 01 in the state where a predetermined interval is maintained from the counter-load-side end face of the electromagnet case 95.

The armature 93 is a discal friction plate that sandwiches the brake disk 91 in cooperation with the plate 92 at the time of braking and is formed of metal that can be adsorbed by the electromagnet 94. The armature 93 is provided at the counter-load side of the electromagnet case 95 to be placed opposite the plate 92 while putting the brake disk 91 therebetween.

The electromagnet case 95 is a vessel, which houses the electromagnet 94 and a spring (not illustrated) for pressing the armature 93 in the counter-load-side direction, and is mounted on the counter-load-side face of the bracket part 22 by the screw 02. A brake wire 96 that supplies an electric power to the electromagnet 94 is connected to the electromagnet 94 housed in the electromagnet case 95. The manipulation of the brake wire 96 is explained in detail later.

A counter-load-side opening face of the housing 2 on which the brake 9 is mounted is blocked up by the brake cover 97. The peripheral border of the brake cover 97 is fixed to the counter-load-side end edge of the housing 2 by a screw 03.

The brake 9 makes the electromagnet 94 adsorb the armature 93 by sending an electric current to the electromagnet 94 and separates the armature 93 from the brake disk 91 to release braking against the rotation of the brake disk 91.

On the other hand, the brake 9 releases the adsorption of the armature 93 by the electromagnet 94 by blocking electric conduction for the electromagnet 94 and presses the armature 93 toward the brake disk 91 by using the biasing force of the spring to control the rotation of the brake disk 91.

In this way, in the rotary electric machine 1, the brake 9 is exchangeably provided at the outer circumferential side of the detector 8. As a result, in the rotary electric machine 1, the brake 9 that is consumables can be easily exchanged in a short time without removing the detector 8.

Now, the exchange operation of the brake 9 in the rotary electric machine 1 will be explained with reference to FIG. 2A, FIG. 2B, FIG. 3A, and FIG. 3B. FIG. 2A, FIG. 2B, FIG. 3A, and FIG. 3B are diagrams illustrating the exchange operation of the brake 9 in the rotary electric machine 1 according to the embodiment. In FIGS. 2A, 2B, 3A, and 3B, the same components as those of FIG. 1 have the same reference numbers.

Figure 2A:
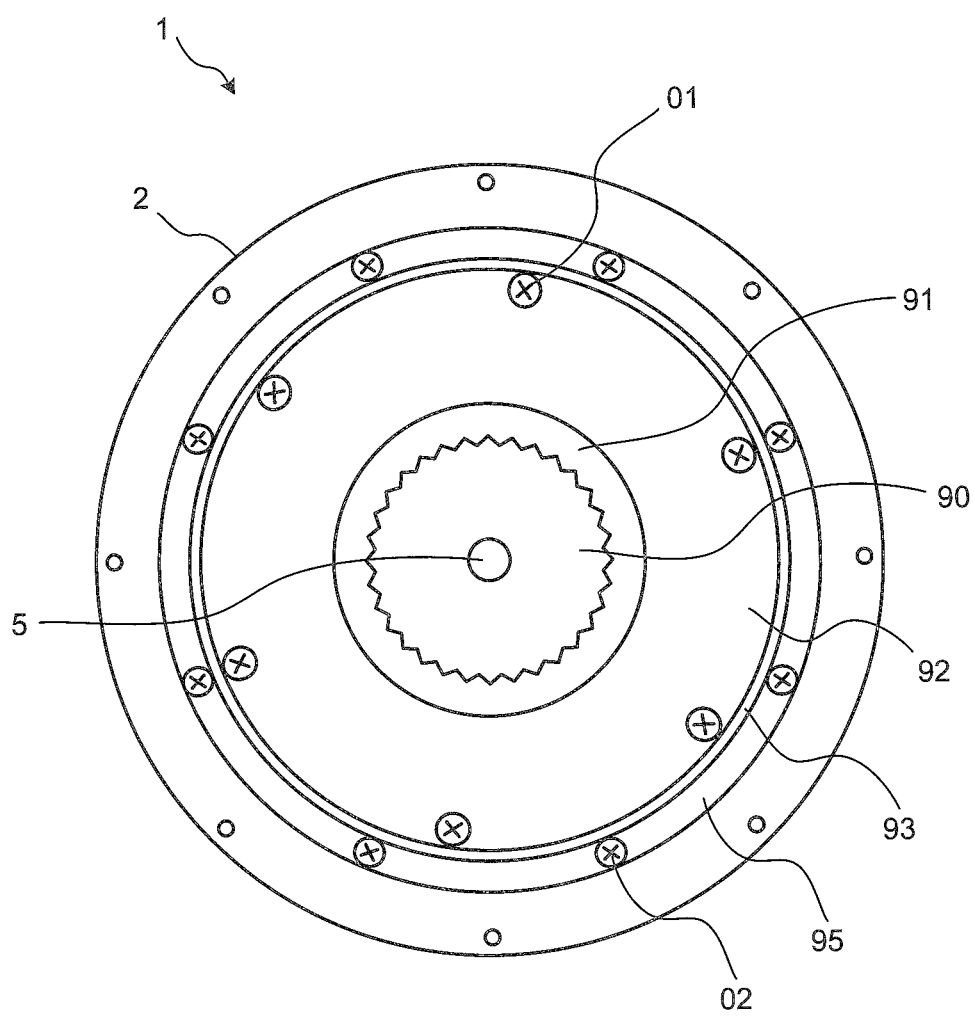
FIGS. 2A to 3B are diagrams illustrating an exchange operation of a brake of the rotary electric machine according to the embodiment.
Figure 2B:
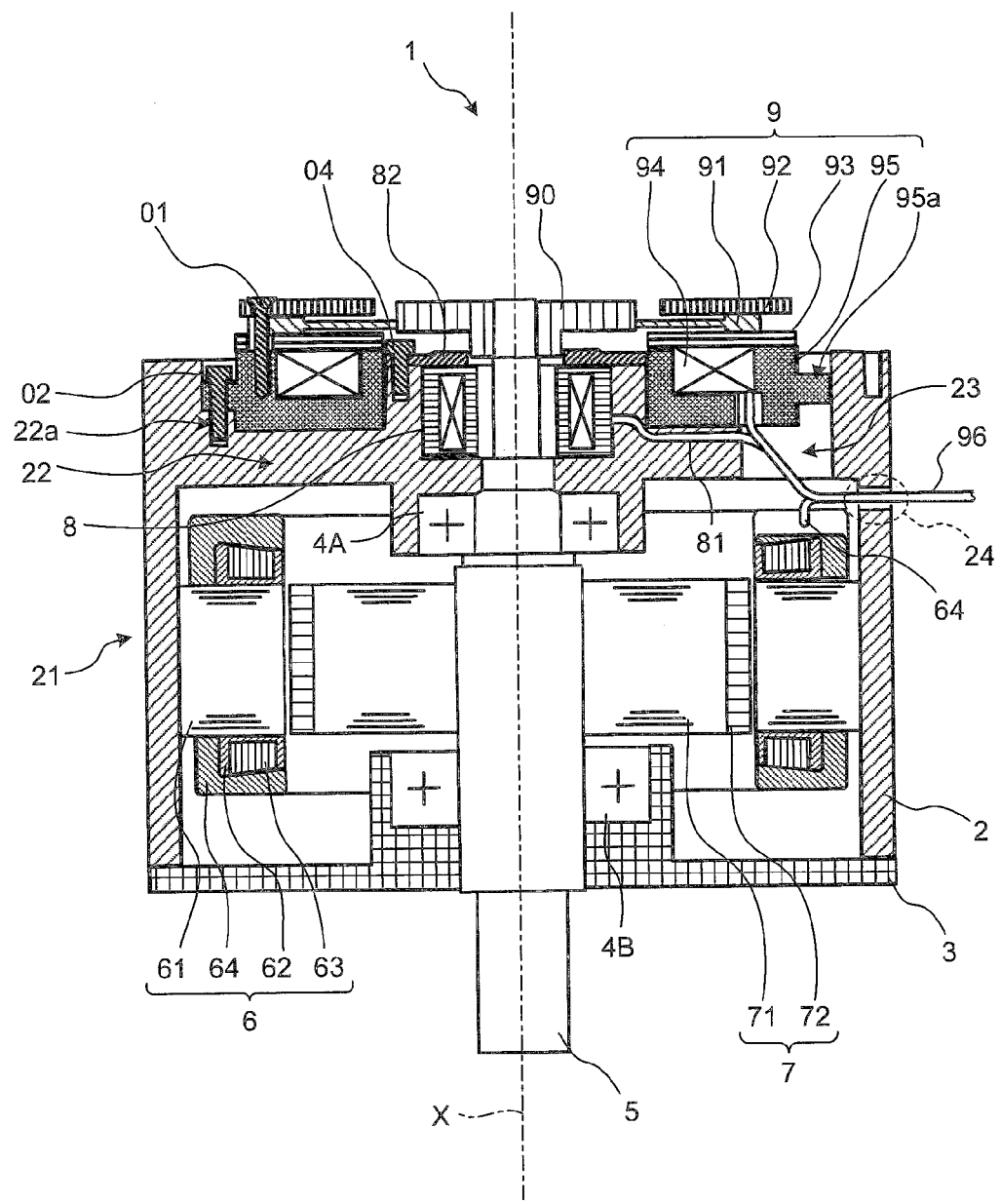
Figure 3A:
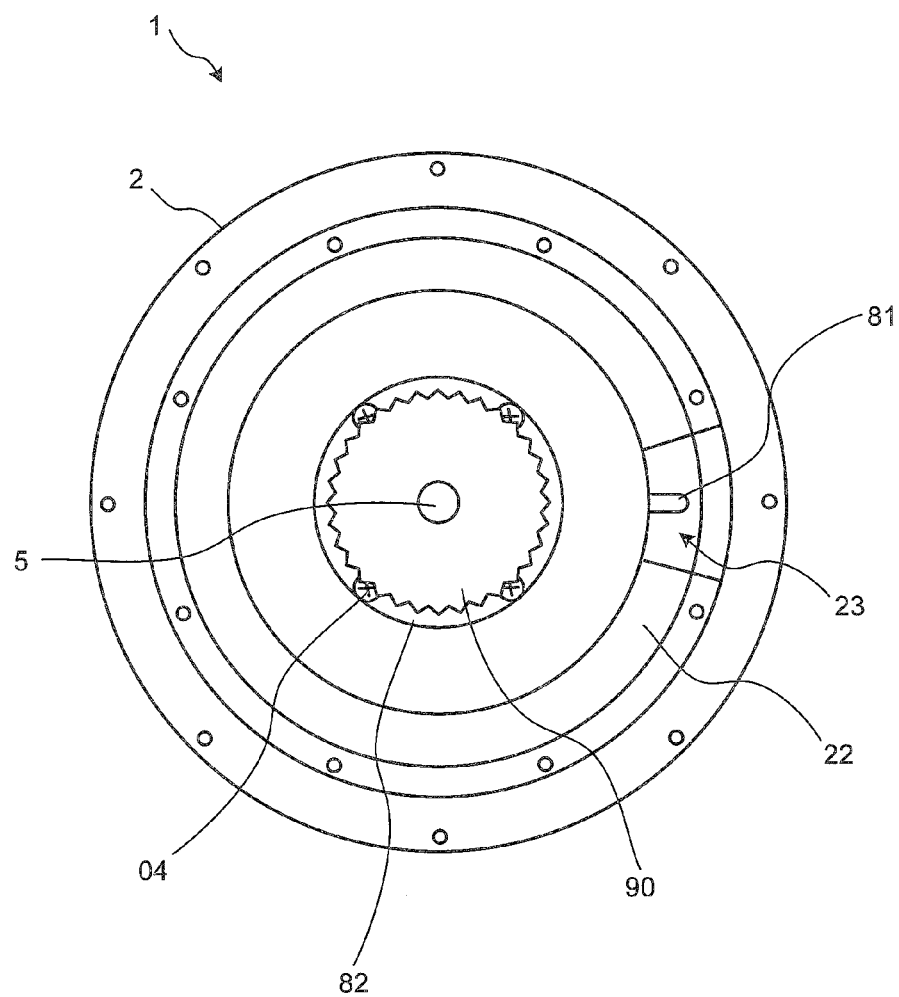
Figure 3B:
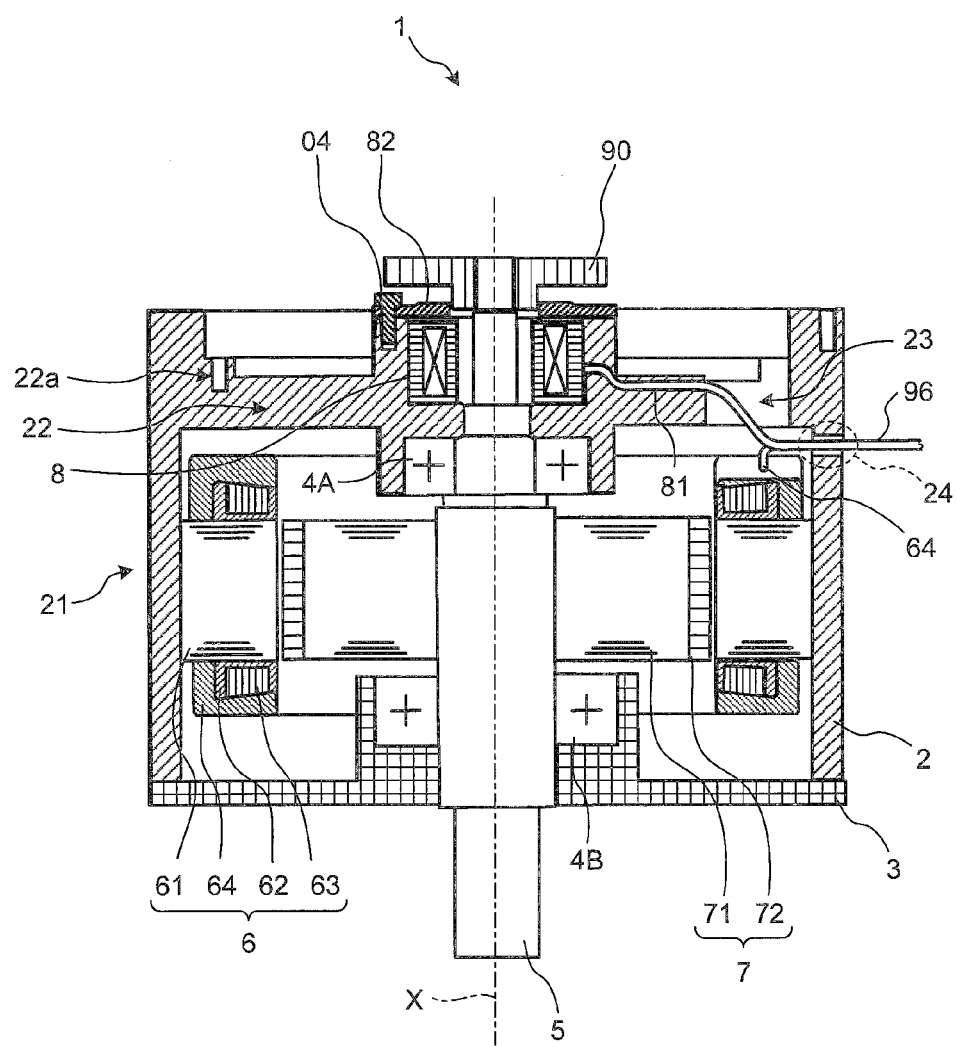

Herein, FIGS. 2A and 3A illustrate plane pattern diagrams when the rotary electric machine 1 during the exchange operation is viewed from the counter-load side. Moreover, FIGS. 2B and 3B illustrate sectional schematic diagrams of the rotary electric machine 1 when the rotary electric machine 1 during the exchange operation is cut by a plane that includes the rotation axis X of the shaft 5 and the extended line of the diameter of the shaft 5.

When the brake 9 of the rotary electric machine 1 is exchanged, the screw 03 (see FIG. 1) is first removed and the brake cover 97 is removed in the state where the electric conduction for the electromagnet 94 is blocked. As a result, as illustrated in FIGS. 2A and 2B, the brake 9 can be visually recognized from the counter-load side of the housing 2.

More specifically, at this time, the screw 02 by which the electromagnet case 95 is fixed to the bracket part 22 of the housing 2 can be visually recognized from the counter-load side of the housing 2. Herein, because the electric conduction for the electromagnet 94 is blocked, the brake disk 91 is sandwiched between the plate 92 and the armature 93.

As described above, the plate 92 is fixed by the screw 01 to the electromagnet case 95. Therefore, the brake 9 can be removed from the bracket part 22 by removing the screw 02 by which the electromagnet case 95 is fixed to the bracket part 22.

As a result, as illustrated in FIGS. 3A and 3B, in the rotary electric machine 1, the detector 8 is left in a state where the detector 8 is held by the bracket part 22. At this time, the hub 90 is left in the rotary electric machine 1.

After that, the new brake 9 is attached to the rotary electric machine 1 by performing an attachment operation in the reverse order against the order of the brake removal operation. More specifically, the inner circumferential surface of the brake disk 91 of the new brake 9 is fitted to the outer circumferential surface of the hub 90.

Then, a hole formed on the peripheral border of the electromagnet case 95 and a hole formed on the peripheral border of the bracket part 22 are aligned and then the electromagnet case 95 is fixed to the bracket part 22 by the screw 02. Finally, the counter-load-side opening of the housing 2 is blocked up by the brake cover 97 and the brake cover 97 is fixed to the housing 2 by the screw 03 so as to complete the exchange operation of the brake 9.

In this way, in the rotary electric machine 1, the brake 9 can be easily exchanged in a short time without touching the detector 8 that is precision instrument. Therefore, the rotary electric machine 1 can prevent a relative position between the shaft 5 and the detector 8 from deviating from a reference due to the exchange operation of the brake 9.

Moreover, the rotary electric machine 1 includes the brake 9 that is provided at the outer circumferential side of the detector 8. As a result, because a size (thickness) occupied by the brake 9 and the detector 8 in the direction along the rotation axis X can be reduced, the rotary electric machine 1 can be thinned in the direction of the rotation axis X.

In the rotary electric machine 1, the braking mechanism of the brake 9 is placed at a more outer side than the detector 8 in the radial direction of the shaft 5. As a result, the brake 9 can control the rotation of the brake disk 91 by using a weak frictional force in comparison with the case where the rotation of the brake disk 91 is controlled at a more inner side than the detector 8 in the radial direction of the shaft 5.

The bracket part 22 of the rotary electric machine 1 includes a tubular isolation wall that surrounds the circumferential surface of the detector 8 facing the electromagnet case 95 of the braking mechanism to isolate the detector 8 from the braking mechanism and a bearing that bears the shaft 5.

More specifically, the load-side small-diameter tube 27 that extends from the hole through which the shaft 5 is inserted to the load side and the counter-load-side small-diameter tube 28 that extends from the hole through which the shaft 5 is inserted to the counter-load side are integrally formed in the bracket part 22. Moreover, the bearing 4A is fitted into the load-side small-diameter tube 27 and the detector 8 is provided inside the counter-load-side small-diameter tube 28.

In other words, in the rotary electric machine 1, the counter-load-side small-diameter tube 28 functions as an isolation wall that isolates the detector 8 from the electromagnet case 95 and the load-side small-diameter tube 27 functions as a bearing that bears the shaft 5.

In this way, in the rotary electric machine 1, the detector 8 is isolated from the electromagnet case 95 of the brake 9 by the counter-load-side small-diameter tube 28. As a result, the rotary electric machine 1 can prevent dust caused by friction between "the plate 92 and the armature 93" and "the brake disk 91" from entering into the detector 8.

As the housing 2 in which the bracket part 22 and the case part 21 are integrally formed, the rotary electric machine 1 may employ a housing that is formed of light metal such as aluminum or a housing that is formed of heavy metal such as iron for blocking a magnetic flux.

When the rotary electric machine 1 employs the housing 2 that is formed of aluminum, for example, the weight of the rotary electric machine 1 can be reduced. On the other hand, when the rotary electric machine 1 employs the housing 2 that is formed of iron, the counter-load-side small-diameter tube 28 can prevent a magnetic flux emitted from the electromagnet 94 of the brake 9 from entering into the detector 8.

Moreover, the bracket part 22 includes a detector cover 82 that blocks up a counter-load-side opening part of the counter-load-side small-diameter tube 28 that houses the detector 8. The detector cover 82 is a discal member of which the center has a hole that has the size by which the rotation of the shaft 5 is not disturbed. The peripheral border of the detector cover 82 is fixed by a screw 04 to a counter-load-side opening edge of the counter-load-side small-diameter tube 28.

In this way, in the rotary electric machine 1, the counter-load-side end face of the detector 8 is coated by the detector cover 82. As a result, the rotary electric machine 1 can more surely prevent dust caused by friction between "the plate 92 and the armature 93" and "the brake disk 91" from entering into the detector 8.

Moreover, when the detector cover 82 is a detector cover that is formed of heavy metal such as iron for blocking a magnetic flux, the rotary electric machine 1 can prevent a magnetic flux emitted from the electromagnet 94 of the brake 9 from entering into the detector 8.

Moreover, the bracket part 22 includes a tube (hereinafter, "large-diameter tube 26") that extends from the counter-load-side end edge to the counter-load side in the tubular case part 21 that houses the rotor 7 and the stator 6. In the rotary electric machine 1, the detector 8 and the electromagnet case 95 of the brake 9 are housed in the large-diameter tube 26.

As a result, the rotary electric machine 1 does not require a brake cover that is likely to coat the electromagnet case 95 up to its outer circumferential surface. Therefore, the rotary electric machine 1 can reduce a material cost that is used for formation of the brake cover 97 in comparison with the case where a housing in which the large-diameter tube 26 is not provided at the counter-load-side end edge of the case part 21 is employed.

Next, the manipulation of wiring in the rotary electric machine 1 will be explained. As illustrated in FIG. 1, the case part 21 of the housing 2 includes a drawing hole 24 for drawing a wire from its inside to its outside on its circumferential surface. Moreover, the bracket part 22 of the housing 2 is a plate-like member that partitions the rotary electric machine 1 into "the detector 8 and the brake 9" and the stator 6 and the rotor 7" and bears the shaft 5.

The bracket part 22 includes a through-hole 23 through which at least one of the detector wire 81 connected to the detector 8 and the brake wire 96 connected to the brake 9 or the stator wire 64 connected to the stator 6 is inserted.

The stator wire 64 is a wire that supplies an electric power for rotating the rotor 7 to the stator 6. Moreover, the detector wire 81 is a wire that outputs a signal current corresponding to the rotation position of the shaft 5 to a predetermined control device (not illustrated). Moreover, the brake wire 96 is a wire that supplies an electric power to the electromagnet 94 of the brake 9 in order to control the rotation of the brake disk 91.

In this way, in the rotary electric machine 1, the through-hole 23 is provided in the bracket part 22 that partitions the rotary electric machine 1 into "the detector 8 and the brake 9" and "the stator 6". As a result, in the rotary electric machine 1, the brake wire 96 and the detector wire 81 can be drawn into the case part 21 through the through-hole 23, and then can be drawn to the outside of the case part 21 through the drawing hole 24 along with the stator wire 64.

Therefore, according to the rotary electric machine 1, a size (thickness) of the side closer to the counter-load side than the bracket part 22 in the direction of the rotation axis X can be reduced in comparison with the case where the brake wire 96 and the detector wire 81 are drawn from the side closer to the counter-load side than the bracket part 22 to the outside of the housing and the stator wire 64 is drawn from the load side of the bracket part 22 to the outside of the housing 2.

The drawing hole 24 may not be provided in the circumferential surface of the case part 21 but may be provided in the circumferential surface of the large-diameter tube 26. In this case, the stator wire 64 is drawn into the counter-load side of the bracket part 22 through the through-hole 23, and is drawn from the drawing hole 24 to the outside of the large-diameter tube 26 along with the brake wire 96 and the detector wire 81.

When this configuration is employed, a size (thickness) of the direction of the rotation axis X in the case part 21 can be reduced in comparison with the case where the brake wire 96 and the detector wire 81 are drawn from the side closer to the counter-load side than the bracket part 22 to the outside of the housing 2 and the stator wire 64 is drawn from the load side of the bracket part 22 to the outside of the housing 2. Moreover, the drawing hole 24 may be a plurality of holes that is provided at the outer periphery of the housing 2. This point is described below with reference to FIG. 5.

Figure 4:
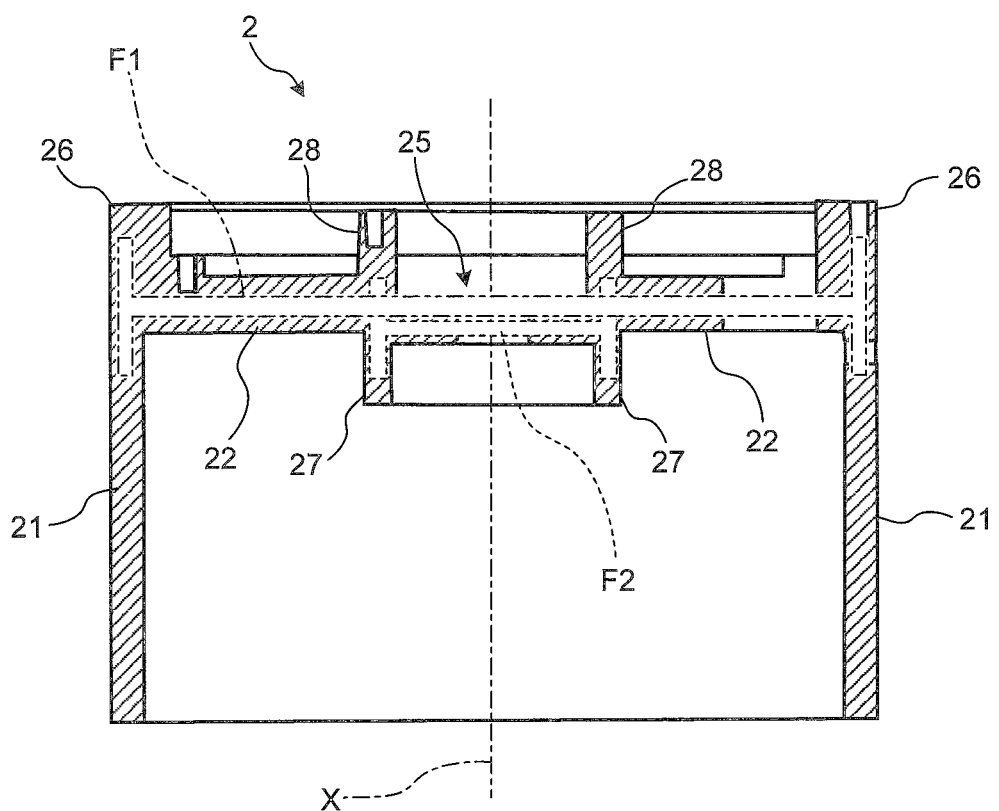
FIG. 4 is a sectional schematic view illustrating a housing according to the embodiment.

Next, the rigidity of the bracket part 22 of the housing 2 will be explained with reference to FIG. 4. FIG. 4 is a sectional schematic diagram illustrating the housing 2 according to the embodiment. The typical cross section of the housing 2 when the housing 2 is cut by a plane that includes the rotation axis X of the shaft 5 and the extended line of the diameter of the shaft 5 is illustrated in FIG. 4. Moreover, the same components of FIG. 4 as those of FIG. 1 have the same reference numbers.

As illustrated in FIG. 4, the housing 2 includes the tubular case part 21 and the plate-like bracket part 22 that are integrally formed. The tubular case part 21 houses the stator 6 and the rotor 7. The plate-like bracket part 22 is provided on the counter-load-side end face of the case part 21 and has an opened hole 25 through which the shaft 5 is inserted. Moreover, the housing 2 further includes the large-diameter tube 26 that is integrated with the case part 21 and extends from the counter-load-side end edge to the counter-load side of the case part 21.

Furthermore, the housing 2 includes the load-side small-diameter tube 27 and the counter-load-side small-diameter tube 28 of which the diameters are smaller than that of the large-diameter tube 26. The load-side small-diameter tube 27 is provided to extend from the hole 25 provided in the center of the bracket part 22 to the load side and the counter-load-side small-diameter tube 28 is provided to extend from the hole 25 to the counter-load side. The load-side small-diameter tube 27 and the counter-load-side small-diameter tube 28 are integrated with the bracket part 22.

For this reason, when the housing 2 is cut by the plane that includes the rotation axis X of the shaft 5 and the extended line of the diameter of the shaft 5, the housing 2 has two cross-sectional H structures called a first cross-sectional H structure F1 indicated by a two-dot chain line in FIG. 4 and a second cross-sectional H structure F2 indicated by a dotted line in FIG. 4.

Therefore, the first cross-sectional H structure F1 of the housing 2 improves the rigidity of the boundary portion between "the case part 21 and the large-diameter tube 26" and "the bracket part 22". Furthermore, the second cross-sectional H structure F2 of the housing 2 further improves the rigidity of the boundary portion between "the load-side small-diameter tube 27 and the counter-load-side small-diameter tube 28" and "the bracket part 22".

In this way, because the housing 2 has high rigidity, a positional deviation is hard to occur in the hole 25 through which the shaft 5 is inserted when the stator 6 is shrunk fit to the case part 21 of the housing 2, for example. Therefore, the bracket part 22 can hold the detector 8 and the shaft 5 at appropriate positions.

As described above, because the housing 2 has high rigidity, a relative position between the shaft 5 and the detector 8 can be prevented from deviating from a reference due to a vibration caused by the rotation of the rotor 7, for example.

Figure 5:
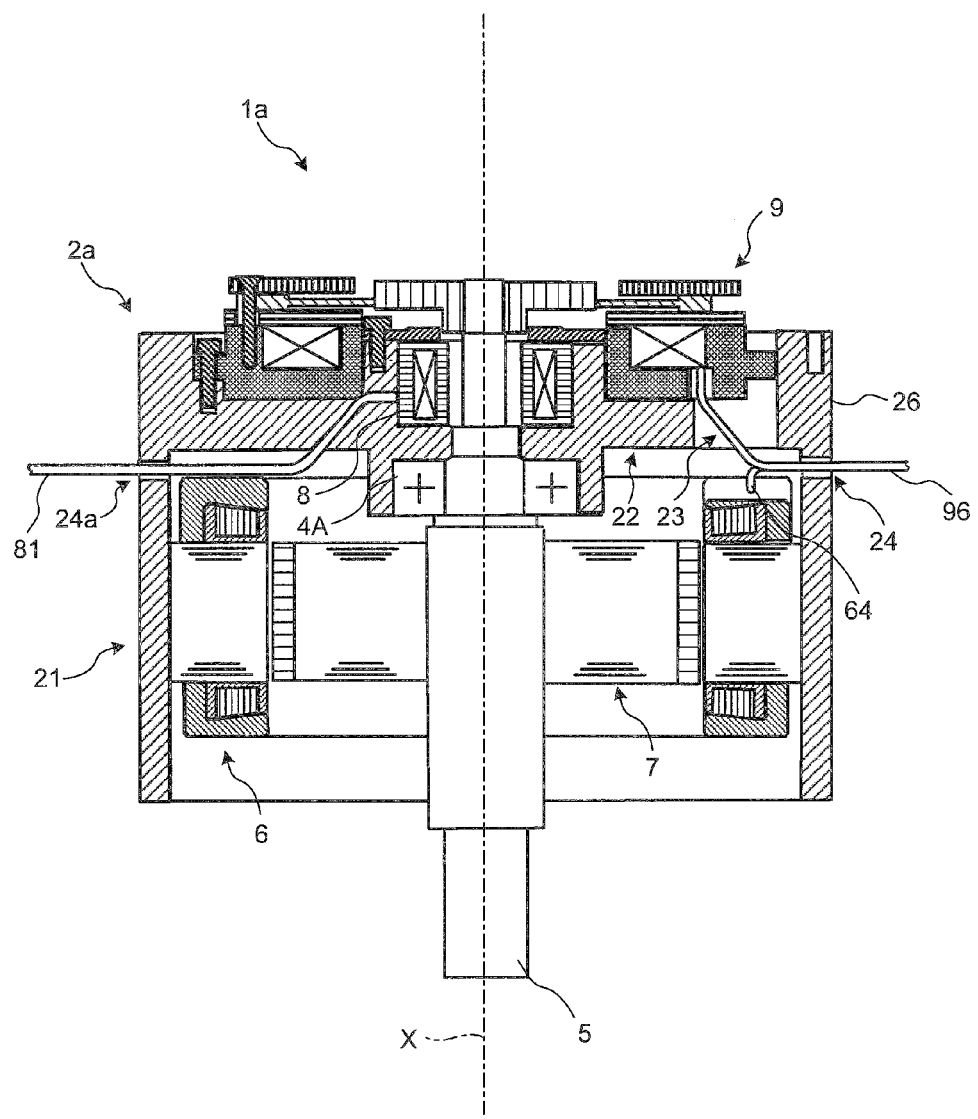
FIG. 5 is a sectional schematic view illustrating a rotary electric machine according to an alternative example of the embodiment.

Next, a rotary electric machine 1a obtained by modifying the manipulation of wires according to an alternative example will be explained with reference to FIG. 5. FIG. 5 is a sectional schematic diagram illustrating the rotary electric machine 1a according to the alternative example of the embodiment. The typical cross section of the rotary electric machine 1a when the rotary electric machine 1a is cut by a plane that includes the rotation axis X of the shaft 5 and the extended line of the diameter of the shaft 5 is illustrated in FIG. 5. In this case, the same components of FIG. 5 as those of FIG. 1 have the same reference numbers.

As illustrated in FIG. 5, the configuration of the rotary electric machine 1a is different from that of the rotary electric machine 1 illustrated in FIG. 1 in that the rotary electric machine 1a includes several holes such as the drawing hole 24 and a drawing hole 24a for drawing wires from the inside to the outside of a housing 2a.

More specifically, the several drawing holes 24 and 24a of the rotary electric machine 1a are provided at positions spaced by a predetermined distance from the end edge of the case part 21 in the same direction parallel to the direction of the rotation axis X of the shaft 5.

In the rotary electric machine 1a, the detector wire 81 is drawn from the drawing hole 24a to the outside of the housing 2a and the brake wire 96 and the stator wire 64 are drawn from the drawing hole 24 to the outside of the housing 2a. In other words, the detector wire 81 is drawn from the drawing hole 24a different from the drawing hole 24, from which wires other than the detector wire 81 are drawn, to the outside of the case part 21 of the housing 2a.

In this way, in the rotary electric machine 1a, wires such as the brake wire 96 and the stator wire 64 that flow a larger current than that of the detector wire 81 are drawn from the drawing hole 24 different from that of the detector wire 81 to the outside of the housing 2a via a route different from the detector wire 81.

As a result, the rotary electric machine 1a can reduce the bad influence that the large currents that flow through the brake wire 96 and the stator wire 64 have an effect on a signal current corresponding to the detection result of the detector 8, which flows through the detector wire 81. Therefore, the rotary electric machine 1a can prevent the detection accuracy of the detector 8 from being decreased due to large currents flowing through the brake wire 96 and the stator wire 64.

The drawing holes 24 and 24a may be provided on the circumferential surface of the large-diameter tube 26 that extends from the counter-load-side end to the counter-load side of the case part 21. Moreover, the three or more drawing holes 24 and 24a may be provided.

The detector 8 may be provided at the side closer to the counter-load side than the attachment position of the brake 9. As a result, when an optical detector that has higher heat quantity than a resolver and thus requires heat dissipation is employed, for example, heat emitted from the detector can be effectively radiated to the counter-load side.

In the above embodiment and alternative example, it has been explained that the bracket part 22 and the case part 21 are integrally formed. However, the bracket part 22 and the case part 21 may be separately formed. In addition, the rotary electric machines 1 and 1a may be an electric motor or may be electric generator.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A rotary electric machine comprising:
a detector that is provided at a counter-load side of a shaft for rotating along with a rotor to drive a predetermined load at a load side of the shaft and detects a rotation position of the shaft;
a brake that is exchangeably provided at an outer circumferential side of the detector and controls a rotation of the shaft, wherein the brake includes:
a rotating part that rotates along with the shaft; and
a braking mechanism that controls a rotation of the rotating part; and
a spline shaft that is fitted to the rotating part to rotate along with the shaft, wherein
the detector and the rotating part are axially disposed along the shaft with the rotating part being closer to the counter-load side of the shaft than the detector, and
the detector and the spline shaft are axially disposed along the shaft with the spline shaft being closer to the counter-load side of the shaft than the detector.

2. The rotary electric machine according to claim 1, further comprising a bracket part including: a tubular isolation wall that surrounds an outer circumferential surface of the detector facing the brake to isolate the detector from the brake; and a bearing that bears the shaft.

3. The rotary electric machine according to claim 1, wherein an outer circumferential surface of the spline shaft is fitted into an inner circumferential surface of the rotating unit.

4. The rotary electric machine according to claim 2, wherein the bracket part is formed of materials for blocking a magnetic flux.

5. The rotary electric machine according to claim 2, wherein the bracket part is provided between the detector and the brake, the bracket part including a detector cover that blocks up a counter-load-side opening part of the tubular isolation wall that houses the detector.

6. The rotary electric machine according to claim 2, wherein the bracket part includes a tube that houses the detector and the brake, the tube extends from a counter-load-side end edge to a counter-load side in a tubular case part that houses the rotor and a stator for driving the rotor.

7. The rotary electric machine according to claim 4, wherein the bracket part is provided between the detector and the brake, the bracket part including a detector cover that blocks up a counter-load-side opening part of the tubular isolation wall that houses the detector.

8. The rotary electric machine according to claim 4, wherein the bracket part includes a tube that houses the detector and the brake, the tube extends from a counter-load-side end edge to a counter-load side in a tubular case part that houses the rotor and a stator for driving the rotor.

9. The rotary electric machine according to claim 5, wherein the detector cover is formed of materials for blocking a magnetic flux.

10. The rotary electric machine according to claim 7, wherein the detector cover is formed of materials for blocking a magnetic flux.

11. The rotary electric machine according to claim 9, wherein the bracket part includes a tube that houses the detector and the brake, the tube extends from a counter-load-side end edge to a counter-load side in a tubular case part that houses the rotor and a stator for driving the rotor.

12. A rotary electric machine comprising:
a rotor;
a stator that drives the rotor;
a shaft that rotates along with the rotor, the shaft driving a predetermined load at a load side of the shaft;
a detector that is provided at a counter-load side of the shaft and detects a rotation position of the shaft;
a hub that rotates along with the shaft, one end of the hub being connected to the shaft; and
a brake that is exchangeably provided at an outer circumferential side of the detector and controls a rotation of the shaft, wherein the brake includes:
a rotating part that is connected to another end of the hub and rotates along with the shaft; and
a braking mechanism that controls a rotation of the rotating part, wherein
the detector and the rotating part are axially disposed along the shaft with the rotating part being closer to the counter-load side of the shaft than the detector, and
the detector and the hub are axially disposed along the shaft with the hub being closer to the counter-load side of the shaft than the detector.

13. The rotary electric machine according to claim 12, further comprising a bracket part including: a tubular isolation wall that surrounds an outer circumferential surface of the detector facing the brake to isolate the detector from the brake; and a bearing that bears the shaft.

14. The rotary electric machine according to claim 12, wherein an outer circumferential surface of the hub is fitted into an inner circumferential surface of the rotating unit.

15. The rotary electric machine according to claim 13, wherein the bracket part is formed of materials for blocking a magnetic flux.

16. The rotary electric machine according to claim 13, wherein the bracket part is provided between the detector and the brake, the bracket part including a detector cover that blocks up a counter-load-side opening part of the tubular isolation wall that houses the detector.

17. The rotary electric machine according to claim 13, wherein the bracket part includes a tube that houses the detector and the brake, the tube extends from a counter-load-side end edge to a counter-load side in a tubular case part that houses the rotor and the stator for driving the rotor.

18. The rotary electric machine according to claim 15, wherein the bracket part is provided between the detector and the brake, the bracket part including a detector cover that blocks up a counter-load-side opening part of the tubular isolation wall that houses the detector.

19. The rotary electric machine according to claim 15, wherein the bracket part includes a tube that houses the detector and the brake, the tube extends from a counter-load-side end edge to a counter-load side in a tubular case part that houses the rotor and the stator for driving the rotor.

20. The rotary electric machine according to claim 18, wherein the detector cover is formed of materials for blocking a magnetic flux.

* * * * *